(12) United States Patent
Lee et al.

(10) Patent No.: US 7,101,634 B2
(45) Date of Patent: Sep. 5, 2006

(54) PERPENDICULAR MAGNETIC RECORDING MEDIA

(75) Inventors: Byung-kyu Lee, Seoul (KR); Hoon-sang Oh, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/456,572

(22) Filed: Jun. 9, 2003

(65) Prior Publication Data
US 2004/0018391 A1  Jan. 29, 2004

(30) Foreign Application Priority Data
Jul. 27, 2002  (KR) .............................. 2002-44462

(51) Int. Cl.
*G11B 5/66* (2006.01)
*G11B 5/70* (2006.01)

(52) U.S. Cl. .................................... 428/831
(58) Field of Classification Search ................ 428/831, 428/828.1, 829
See application file for complete search history.

(56) References Cited

U.S. PATENT DOCUMENTS

| | | | |
|---|---|---|---|
| 4,677,032 A | | 6/1987 | Robinson |
| 5,750,270 A | * | 5/1998 | Tang et al. ................ 428/611 |
| 6,475,611 B1 | * | 11/2002 | Chen ......................... 428/213 |
| 6,794,028 B1 | * | 9/2004 | Uwazumi et al. ........... 428/336 |
| 2003/0108776 A1 | * | 6/2003 | Chang et al. ........ 428/694 TM |
| 2004/0247945 A1 | * | 12/2004 | Chen et al. ............ 428/964 TS |

OTHER PUBLICATIONS

Sato et al., "Co—CrPt—Ta perpenducular magnetic recording media using Pt seed layer", Sep. 2000, IEEE Trans Magn, vol. 36, No. 5, pp. 2387-2389.*
Text of the First Office Action issued by the Chinese Patent Office on Nov. 5, 2004 in corresponding application.

* cited by examiner

*Primary Examiner*—Holly Rickman
(74) *Attorney, Agent, or Firm*—Buchanan Ingersoll & Rooney PC

(57) ABSTRACT

A perpendicular magnetic recording medium including a perpendicular magnetic recording layer placed over a substrate, and a multi-layered perpendicular orientation underlayer placed between the substrate and the perpendicular magnetic recording layer and having first and third underlayers each made of Pt or an alloy thereof. Due to the use of a three-layered perpendicular orientation underlayer, an excellent perpendicular orientation and a consistent crystal lattice of a Pt underlayer are obtained. Also, the perpendicular orientation underlayer has small crystal grains. Thus, the perpendicular orientation underlayer having excellent perpendicular orientation and small crystal grains enables a perpendicular magnetic recording layer to have a good thermal stability, a high recording density, and a high SNR.

4 Claims, 4 Drawing Sheets

1: PERPENDICULAR MEDIA ACCORDING TO THE PRESENT INVENTION
2: PERPENDICULAR MEDIA HAVING SINGLE Pt UNDERLAYER
3: PERPENDICULAR MEDIA HAVING SINGLE Ti UNDERLAYER

PERPENDICULAR MAGNETIC RECORDING MEDIA

BACKGROUND OF THE INVENTION

This application claims the priority of Korean Patent Application No. 2002-44462, filed on Jul. 27, 2002, in the Korean Intellectual Property Office, the disclosure of which is incorporated herein in its entirety by reference.

1. Field of the Invention

The present invention relates to perpendicular magnetic recording media, and more particularly, to a perpendicular magnetic recording medium with an increased recording density.

2. Description of the Related Art

Perpendicular magnetic recording media generally have high recording density, as compared to longitudinal magnetic recording mechanism. Hence, recent hard disk drives (HDDs) use perpendicular magnetic recording media to obtain a high recording density. Perpendicular magnetic recording media have a magnetization that is perpendicular to the-main plane of the media. The recording density of such perpendicular magnetic recording media is greatly affected by the properties of a perpendicular magnetic recording layer and by an underlayer which perpendicularly orients a magnetization in a magnetic recording layer.

FIG. 1 shows the layer structure of a conventional perpendicular magnetic recording medium having a single magnetic layer. FIGS. 2 and 3 show the later structures of conventional perpendicular magnetic recording media having two magnetic layers.

Referring to FIG. 1, a perpendicular magnetic recording layer 13, where information is recorded, is placed over the upper surface of a substrate 11. A perpendicular orientation underlayer 12 for perpendicularly orienting the magnetization of the perpendicular magnetic recording layer 13 is placed between the substrate 11 and the perpendicular magnetic recording layer 13. A protection layer 14 is formed on the perpendicular magnetic recording layer 13 to protect the perpendicular magnetic recording layer 13. A lubricating layer 15 is formed on the protection layer 14 to reduce abrasion of a magnetic head of an HDD and the protection layer 14 due to collision and sliding of the protective layer 14 and the magnetic head.

Referring to FIG. 2, a perpendicular magnetic recording layer 23, where information is recorded, is placed over the upper surface of a substrate 21. A soft material layer 22, which forms a magnetic path of a perpendicular magnetic field generated by a magnetic head of an HDD, is placed between the substrate 21 and the perpendicular magnetic recording layer 23. A protection layer 24 and a lubricating layer 25 are sequentially formed on the perpendicular magnetic recording layer 23.

Referring to FIG. 3, a perpendicular magnetic recording layer 224, where information is recorded, is placed over the upper surface of a substrate 221. A perpendicular orientation underlayer 223 and a soft material layer 222 are placed between the substrate 221 and the perpendicular magnetic recording layer 224. A protection layer 225 and a lubricating layer 226 are sequentially formed on the perpendicular magnetic recording layer 224.

The types and composition ratio of elements that form each of the perpendicular magnetic recording layers 13, 23, and 224 greatly affect the types and structures of the corresponding perpendicular orientation underlayers 12 and 223 and the soft magnetic layer 22. An existing perpendicular orientation underlayer formed of Ti or Pt is greatly affected by the characteristics of a perpendicular magnetic recording layer. If a perpendicular orientation underlayer is formed of Ti, a thick initial growth film is formed between the perpendicular magnetic layer and the Ti perpendicular orientation underlayer due to the difference in the crystal lattice constant between them. Thus, the orientation characteristic of the perpendicular magnetic recording layer is deteriorated. A perpendicular orientation underlayer formed of Pt has an excellent perpendicular crystal orientation because it has a small difference in the lattice constant from the perpendicular magnetic recording layer. However, the excellent perpendicular crystal orientation shown in some perpendicular magnetic recording layers causes crystal grains to be enlarged and exchanged coupling to be increased, thereby degrading a signal-to-noise ratio (SNR) upon information recording/writing.

SUMMARY OF THE INVENTION

The present invention provides a perpendicular magnetic recording medium which has an increased recording density by improving perpendicular orientation properties.

According to an aspect of the present invention, there is provided a perpendicular magnetic recording medium in which a perpendicular magnetic recording layer is placed on a substrate and a multi-layered perpendicular orientation underlayer is placed between the substrate and the perpendicular magnetic recording layer and having first and third underlayers each made of Pt or an alloy thereof.

In the perpendicular magnetic recording medium, at least one of the first and third underlayers is formed of any of Pt and a Pt alloy, and the second underlayer is formed of any of Ti and a Ti alloy.

Also, in an embodiment of the perpendicular magnetic recording medium, a soft magnetic layer is placed between the perpendicular orientation layer and the substrate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
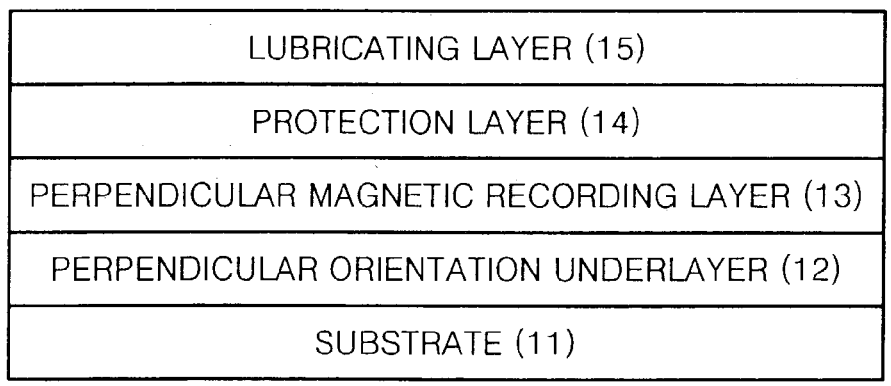
FIG. 1 shows the layer structure of a conventional perpendicular magnetic recording medium with a single magnetic layer.
Figure 2:
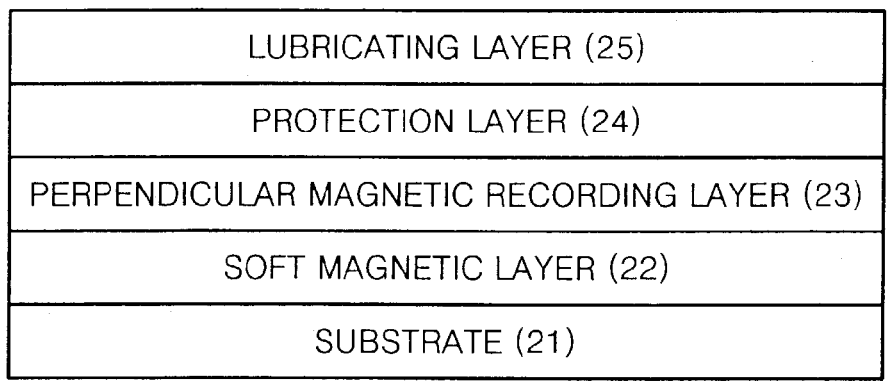
FIG. 2 shows the layer structure of a conventional perpendicular magnetic recording medium with two magnetic layers.
Figure 3:
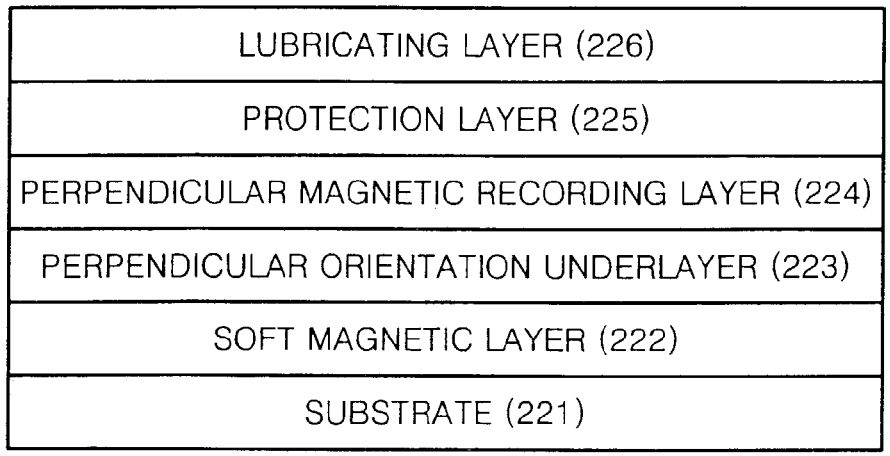
FIG. 3 shows the layer structure of another conventional perpendicular magnetic recording medium with two magnetic layers.
Figure 4:
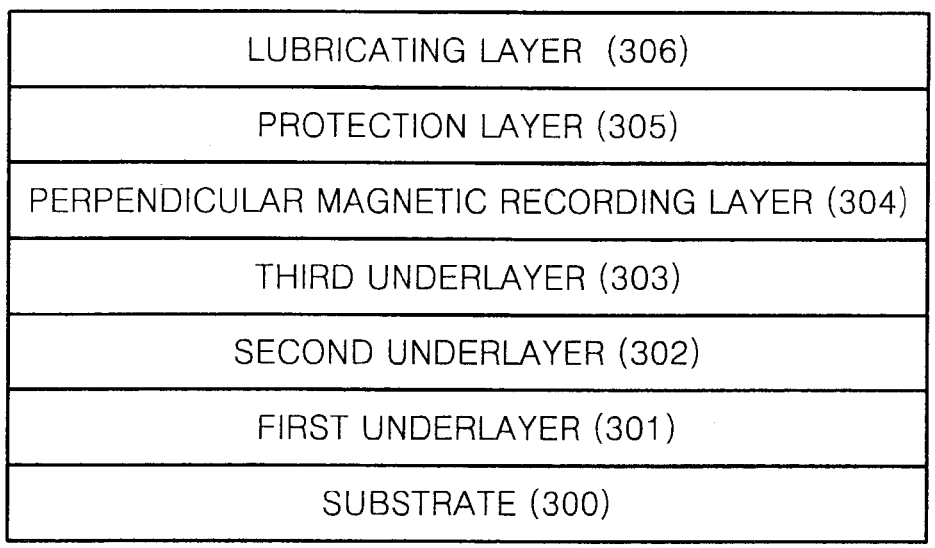
FIG. 4 shows the layer structure of a perpendicular magnetic recording medium according to a first embodiment of the present invention.

A perpendicular magnetic recording medium according to a first embodiment of the present invention shown in FIG. 4 has a single magnetic layer. A perpendicular magnetic recording medium according to a second embodiment of the present invention shown in FIG. 5 has two magnetic layers.

Referring to FIG. 4, first, second, and third underlayers 301, 302, and 303 are sequentially formed on the upper surface of a substrate 300. A perpendicular magnetic recording layer 304, where information is recorded, is formed on the third underlayer 303. As in conventional magnetic recording media, a protection layer 305 and a lubricating layer 306 are formed on the perpendicular magnetic recording layer 304.

Figure 5:
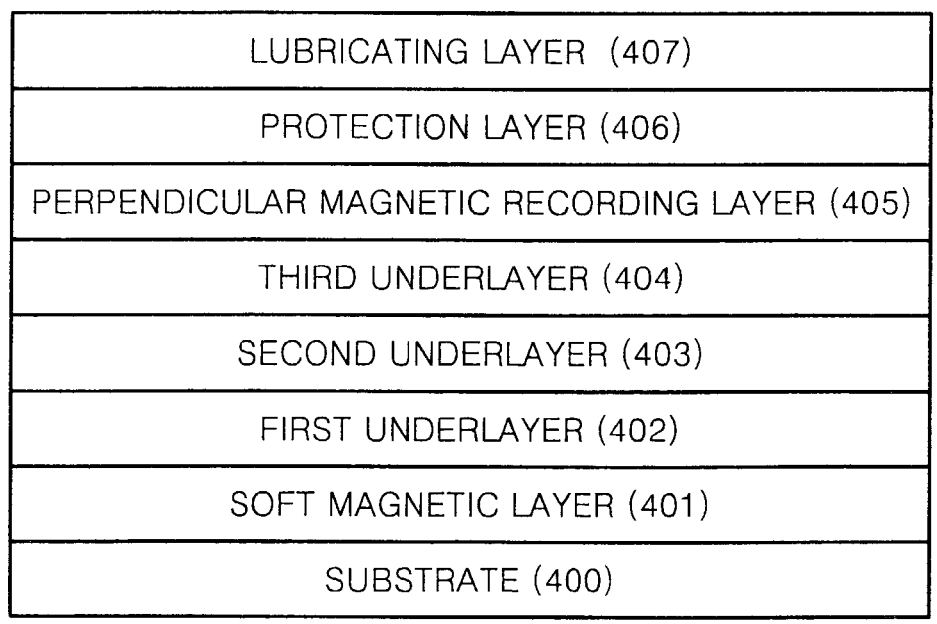
FIG. 5 shows the layer structure of a perpendicular magnetic recording medium according to a second embodiment of the present invention.

Referring to FIG. 5, in contrast with the first embodiment of FIG. 4, a soft magnetic layer 401 is first formed on the upper surface of a substrate 400. Next, first, second, and third underlayers 402, 403, and 404 are sequentially formed on the soft magnetic layer 401. A perpendicular magnetic recording layer 405, where information is recorded, is formed on the third underlayer 404. As in conventional magnetic recording media, a protection layer 406 and a lubricating layer 407 are formed on the perpendicular magnetic recording layer 405.

In the perpendicular magnetic recording media according to the present invention, the three underlayers 301, 302, and 303 (or 402, 403, and 404) are used to form a perpendicular orientation underlayer to improve the perpendicular orientation of the perpendicular magnetic recording layer 304 (or 405).

The first underlayers 301 and 402 and the third underlayers 303 and 404 are mainly formed of Pt, and the second underlayers 302 and 403 are mainly formed of Ti.

If a single Pt underlayer is used as a perpendicular orientation underlayer, some perpendicular magnetic recording layers increase exchange coupling and enlarge crystal grains. Thus, noise upon information recording/writing is increased, and electrical characteristics, such as, a coercive force or a second-quadrant hysteresis loop inclination, are deteriorated. These problems are mainly due to the thickness of the Pt underlayer. If the Pt underlayer is thick, the crystal grains of the Pt underlayer are enlarged. Accordingly, the crystal grains of the perpendicular magnetic recording layer are enlarged, and exchange coupling increases.

A thin Pt underlayer decreases the size of crystal grains and an exchange coupling of the perpendicular magnetic recording layer and also provides an excellent perpendicular orientation. However, if the Pt underlayer is too thin, it cannot form a complete layer structure, and accordingly it is difficult to be used.

In the present invention, in order to overcome the defects of the single Pt underlayer and form a perpendicular orientation underlayer with excellent properties, a first Pt thin underlayer is deposited to obtain stability. Next, a very thin second underlayer is deposited using Ti or the like to prevent crystal grains from being enlarged and to have the properties of the first Pt underlayer. Finally, a third Pt underlayer is deposited to provide excellent magnetic characteristics to a perpendicular magnetic recording layer and reduce the size of crystal grains and an exchange coupling effect. Therefore, a thermally-stable perpendicular magnetic recording medium with an excellent SNR can be obtained.

Figure 6:
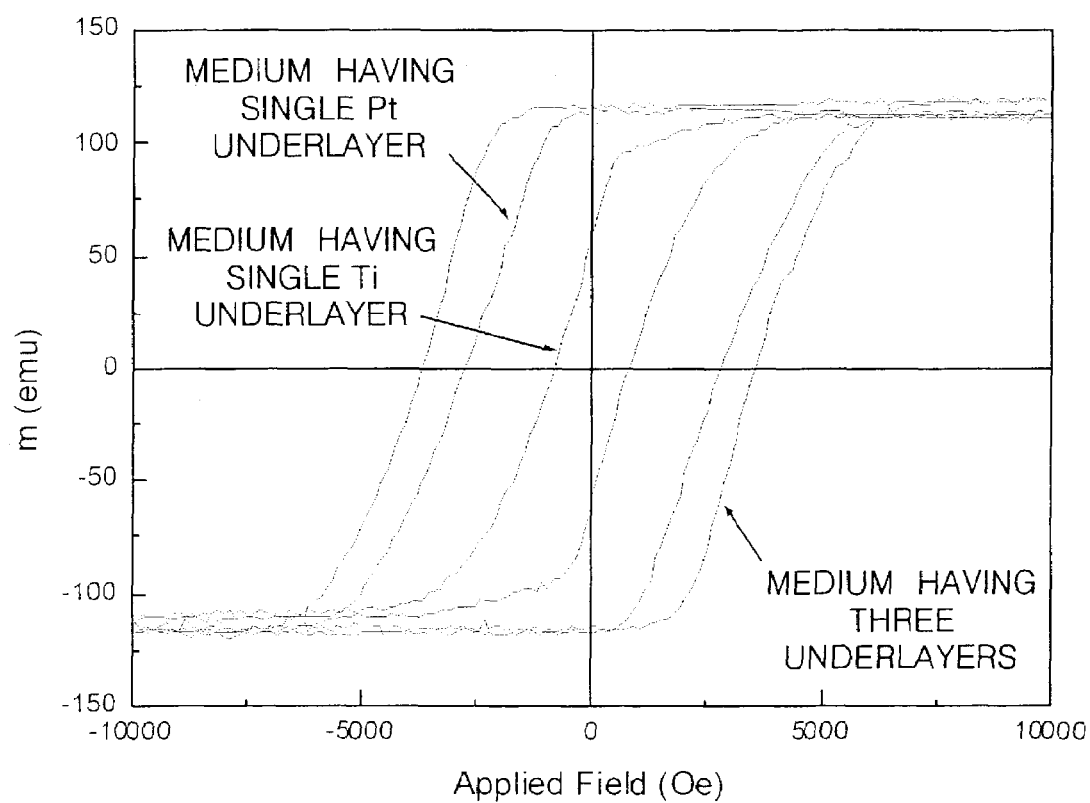
FIG. 6 shows magnetic hysteresis loops of a perpendicular magnetic recording medium according to the present invention.

FIG. 6 shows the magnetic hysteresis loop of a perpendicular magnetic recording layer having a three-layered perpendicular orientation underlayer according to the present invention and the magnetic hysteresis loops of two conventional perpendicular magnetic recording media having single-layered perpendicular orientation underlayers made of Pt and Ti.

As shown in FIG. 6, the perpendicular magnetic recording layer having a three-layered perpendicular orientation underlayer according to the present invention has a higher coercive force value (Hc), a higher nucleation field value (Hn), and a higher squareness value (SQ) than those of the two conventional perpendicular magnetic recording media. Consequently, the perpendicular magnetic recording layer having a three-layered perpendicular orientation underlayer according to the present invention can provide an excellent thermal stability and a low exchange coupling.

Figure 7:
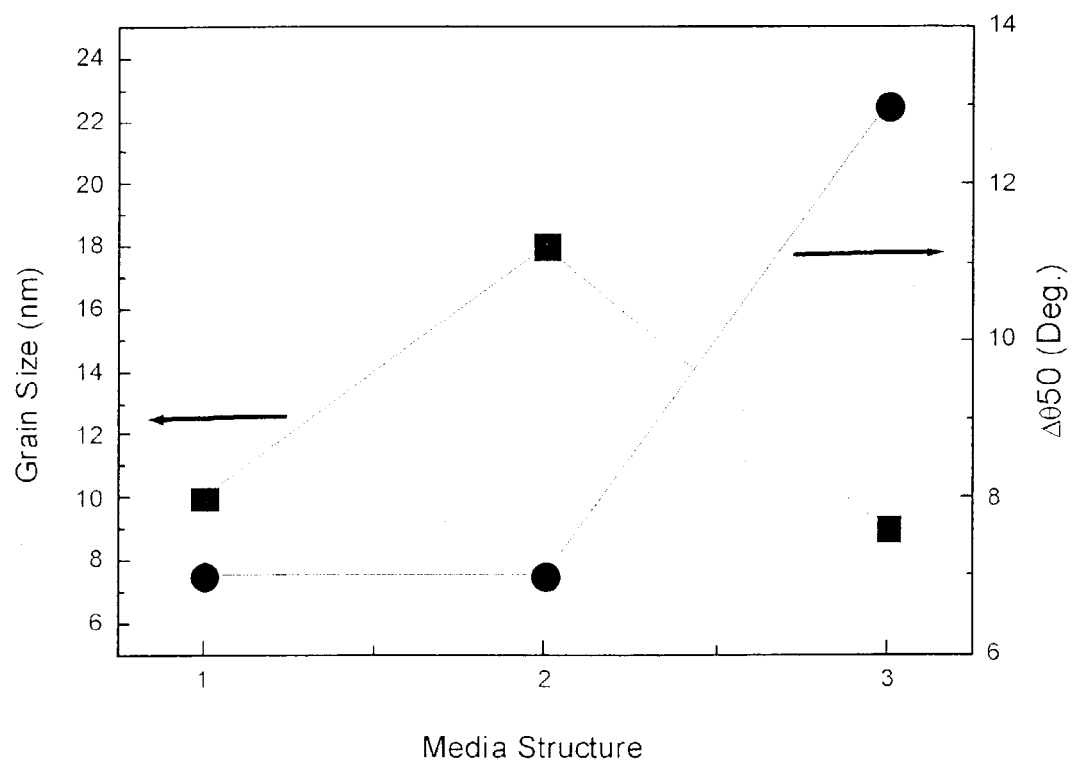
FIG. 7 is a graph showing the size of grains and a perpendicular orientation characteristic of a perpendicular magnetic recording medium according to the present invention.

FIG. 7 shows the size of crystal grains and the crystal orientation of perpendicular magnetic recording media having a three-layered perpendicular orientation underlayer according to the present invention. It can be seen from FIG. 7 that the perpendicular magnetic recording media according to the present invention have similar-sized crystal gains to those of two conventional perpendicular magnetic recording media and an excellent perpendicular orientation. As a result, the perpendicular magnetic recording media according to the present invention can achieve high-density recording with a high SNR.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, due to the use of a three-layered perpendicular orientation underlayer, an excellent perpendicular orientation and a consistent crystal lattice of a Pt underlayer can be obtained. Also, the perpendicular orientation underlayer has small crystal grains. Thus, the perpendicular orientation underlayer having excellent perpendicular orientation and small crystal grains enables a perpendicular magnetic recording layer to have a good thermal stability, a high recording density, and a high SNR.

What is claimed is:

1. A perpendicular magnetic recording medium comprising:
  a perpendicular magnetic recording layer placed over a substrate; and
  a multi-layered perpendicular orientation underlayer placed between the substrate and the perpendicular magnetic recording layer and having first, second and third underlayers, wherein first and third underlayers are each made of one of Pt and a Pt alloy, and wherein the first underlayer is in physical contact with the second underlayer, the second underlayer is in physical contact with the third underlayer and the third underlayer is in physical contact with said perpendicular magnetic recording layer,
  wherein the second underlayer is formed of any of Ti and a Ti alloy.

2. The perpendicular magnetic recording medium of claim 1, wherein a soft magnetic layer is placed between the perpendicular orientation layer and the substrate.

3. The perpendicular magnetic recording medium of claim 1, wherein the multi-layered perpendicular orientation underlayer includes first, second and third underlayers, and the first and third underlayers are formed of Pt, and the second underlayer is formed of Ti.

4. The perpendicular magnetic recording medium of claim 3, wherein a soft magnetic layer is placed between the perpendicular orientation layer and the substrate.

* * * * *